(12) United States Patent
Li et al.

(10) Patent No.: US 11,575,134 B2
(45) Date of Patent: Feb. 7, 2023

(54) POSITIVE ELECTRODE PLATE AND ELECTROCHEMICAL DEVICE

(71) Applicant: Contemporary Amperex Technology Co., Limited, Ningde (CN)

(72) Inventors: Wei Li, Ningde (CN); Qingrui Xue, Ningde (CN); Jing Li, Ningde (CN); Zige Zhang, Ningde (CN); Jianbao Xu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 287 days.

(21) Appl. No.: 16/969,475

(22) PCT Filed: Nov. 15, 2019

(86) PCT No.: PCT/CN2019/118695
§ 371 (c)(1),
(2) Date: Aug. 12, 2020

(87) PCT Pub. No.: WO2020/098769
PCT Pub. Date: May 22, 2020

(65) Prior Publication Data
US 2021/0013513 A1 Jan. 14, 2021

(30) Foreign Application Priority Data

Nov. 16, 2018 (CN) .......................... 201811366548.2

(51) Int. Cl.
*H01M 4/62* (2006.01)
*H01M 4/131* (2010.01)
*H01M 4/133* (2010.01)
*H01M 4/134* (2010.01)
*H01M 4/137* (2010.01)
(Continued)

(52) U.S. Cl.
CPC .......... *H01M 4/626* (2013.01); *H01M 4/131* (2013.01); *H01M 4/133* (2013.01); *H01M 4/134* (2013.01);
(Continued)

(58) Field of Classification Search
None
See application file for complete search history.

(56) References Cited

U.S. PATENT DOCUMENTS 9,627,722 B1 * 4/2017 Fan ...................... C09D 109/06
2018/0019505 A1 1/2018 Fan et al.
(Continued)

FOREIGN PATENT DOCUMENTS

CN 101752549 A 6/2010
CN 102575322 A 7/2012
(Continued)

OTHER PUBLICATIONS

PCT International Search Report for PCT/CN2019/118695, dated Jan. 23, 2020, 12 pages.
(Continued)

*Primary Examiner* — Carlos Barcena
(74) *Attorney, Agent, or Firm* — East IP P.C.

(57) ABSTRACT

This application relates to a positive electrode plate and an electrochemical device. The positive electrode plate comprises a metal current collector, a positive electrode active material layer and a safety coating disposed between the metal current collector and the positive electrode active material layer; the safety coating comprises a polymer matrix, a conductive material and an inorganic filler; the positive electrode active material layer comprises $Li_{1+x}Ni_aCo_bMe_{(1-a-b)}O_2$, wherein $-0.1 \leq x \leq 0.2$, $0.6 \leq a < 1$, $0 < b < 1$, $0 < (1-a-b) < 1$, and Me is at least one of Mn, Al, Mg, Zn, Ga, Ba, Fe, Cr, Sn, V, Sc, Ti and Zr; and the metal current collector is a porous aluminum-containing current collector. The positive electrode plate can improve safety and electrical performances of an electrochemical device (such as a capacitor, a primary battery, or a secondary battery).

19 Claims, 4 Drawing Sheets

(51) Int. Cl.
  *H01M 4/36*    (2006.01)
  *H01M 4/505*   (2010.01)
  *H01M 4/525*   (2010.01)
  *H01M 4/66*    (2006.01)
  *H01M 10/0525* (2010.01)
  *H01M 4/02*    (2006.01)

(52) U.S. Cl.
  CPC ........... *H01M 4/137* (2013.01); *H01M 4/366* (2013.01); *H01M 4/505* (2013.01); *H01M 4/525* (2013.01); *H01M 4/661* (2013.01); *H01M 10/0525* (2013.01); *H01M 2004/028* (2013.01); *H01M 2220/20* (2013.01)

(56) References Cited

U.S. PATENT DOCUMENTS

| | | | | |
|---|---|---|---|---|
| 2018/0026301 | A1* | 1/2018 | Ebisuzaki | H01M 4/587 429/245 |
| 2019/0245182 | A1* | 8/2019 | Liao | H01M 50/411 |

FOREIGN PATENT DOCUMENTS

| | | |
|---|---|---|
| CN | 105470523 A | 4/2016 |
| CN | 106450327 A | 2/2017 |
| CN | 107437622 A | 12/2017 |
| CN | 107565137 A | 1/2018 |
| CN | 108682864 A | 10/2018 |
| JP | 2014146497 A | 8/2014 |
| JP | 2018116810 A | 7/2018 |

OTHER PUBLICATIONS

The First Office Action and search report dated Sep. 4, 2020 for Chinese Application No. 201811366548.2, 10 pages.
The Second Office Action and search report dated Nov. 6, 2020 for Chinese Application No. 201811366548.2, 7 pages.
The Third Office Action for Chinese Application No. 201811366548.2, dated Jan. 26, 2021, 10 pages.
The Extended European Search Report for EP Application No. 19883827.8, dated Mar. 24, 2021, 5 pages.

* cited by examiner

POSITIVE ELECTRODE PLATE AND ELECTROCHEMICAL DEVICE

CROSS-REFERENCE TO RELATED APPLICATION

This application is a National Stage of International Application No. PCT/CN2019/118695, filed on Nov. 15, 2019, which claims priority to Chinese Patent Application No. 201811366548.2 filed on Nov. 16, 2018, both of which are hereby incorporated by reference in their entireties.

TECHNICAL FIELD

This application relates to the technical field of electrochemical technology, and more particularly relates to a positive electrode plate and an electrochemical device comprising such positive electrode plate.

BACKGROUND

Lithium ion batteries are widely used in electric vehicles and consumer electronics because of their high energy density, high output power, long cycle life and small environmental pollution.

Nowadays, ternary materials have become one of the main positive materials used in commercial lithium ion batteries, especially in the field of lithium ion batteries for electric vehicles. High-nickel ternary materials (such as NCM622, NCM811) are expected to become the main cathode materials for the new generation of lithium-ion batteries in electric vehicles, due to high energy density. However, high-nickel ternary materials have poor thermal stability, and will release at high temperature substances with strong oxidizing property that oxidize non-aqueous electrolytes and deteriorate the high temperature performance of lithium ion batteries, and thus cause serious safety issues. Especially, when subjected to abnormal conditions such as crushing, bumping or puncture, lithium ion batteries comprising high-nickel ternary material system are prone to fire and explode and similar risks causing serious harm. Therefore, these issues greatly limit the application and popularity of high-nickel ternary materials.

In view of this, it is indeed necessary to provide an electrode plate and a battery with improved safety and battery performance of high-nickel ternary materials, which is/are capable of avoiding the above problems in the prior art.

SUMMARY

It is an object of this application to provide an electrode plate and an electrochemical device comprising high-nickel ternary materials with improved safety and electrical performances.

It is a further object of this application to provide an electrode plate and an electrochemical device with good safety and improved electrical performance, especially with improved nail penetration safety performance (also referred to as safety performance during nail penetration).

The present application provides a positive electrode plate, comprising a metal current collector, a positive electrode active material layer and a safety coating disposed between the metal current collector and the positive electrode active material layer; the safety coating comprises a polymer matrix, a conductive material and an inorganic filler; wherein in the safety coating, based on the total weight of the polymer matrix, the conductive material and the inorganic filler, a content of the inorganic filler is from 10 wt % to 60 wt % and preferably from 10 wt % to 60 wt %, a content of the polymer matrix is from 35 wt % to 75 wt %, and a content of the conductive material is from 5 wt % to 25 wt %; the positive electrode active material layer comprises $Li_{1+x}Ni_aCo_bMe_{(1-a-b)}O_2$, wherein $-0.1 \le x \le 0.2$, $0.6 \le a < 1$, $0 < b < 1$, $0 < (1-a-b) < 1$, and Me is at least one of Mn, Al, Mg, Zn, Ga, Ba, Fe, Cr, Sn, V, Sc, Ti and Zr; and the metal current collector is a porous aluminum-containing current collector.

The application also provides an electrochemical device comprising the positive electrode plate according to present application, wherein the electrochemical device is preferably a capacitor, a primary battery or a secondary battery.

DESCRIPTION OF THE DRAWINGS

The positive electrode plate and the electrochemical device of this application as well as the beneficial effects thereof will be described in details below with reference to the accompanying drawings and specific embodiments.

Figure 1:
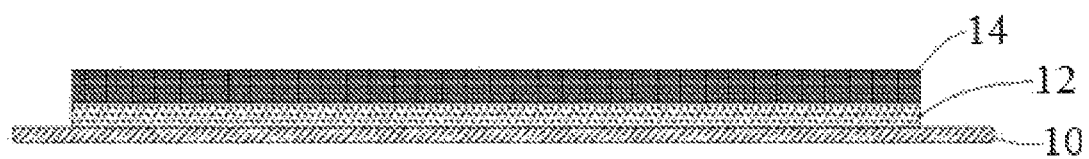
FIG. 1 is a schematic structural view of a positive electrode plate according to an embodiment of this application, in which 10—a metal current collector; 14—a positive electrode active material layer; 12—a safety coating (i.e. a PTC safety coating).

Among them, the reference numerals are defined as follows:
1 battery pack
2 upper cabinet body
3 lower cabinet body
4 battery module
5 battery
  51 case
  52 electrode assembly
  53 top cover assembly.

DETAILED DESCRIPTION

Upon studying the related solutions, the inventors have found that, in the related solutions, PTC materials are usually used to improve the safety performance of lithium ion battery. The inventors have found that, PTC (Positive Temperature Coefficient) material is a positive temperature coefficient heat sensitive material, which has the characteristic that its resistivity increases with increasing temperature. When the temperature exceeds a certain temperature, the resistivity of the PTC material increases rapidly stepwise. In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even destroying the conductive path of the entire electrode active material layer. Thus the security effect is achieved by causing power interruption and preventing the electrochemical reaction from proceeding. However, with this modification, the PTC material added in the electrode active material layer adversely affects the electrochemical performance of the battery.

The inventors have found that, still other studies have provided a separate layer of PTC material (safety coating) between the metal current collector and the electrode active material layer of the battery. When the temperature of the battery rises, the resistance of the PTC material layer increases, so that the electric resistance between the metal current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material (typically polyethylene, polypropylene, or ethylene-propylene copolymers and the like) of the PTC layer and thus the dissolved PTC material enters the upper active material layer, which not only destroys the PCT effect of the PTC layer and also deteriorates its electrical properties. In addition, in the compacting step of the plate fabrication process, the PTC material layer is easily squeezed to the edge and thus the electrode active material layer would directly contact the metal current collector, so that the PTC material layer cannot improve the safety performance. This type of traditional PTC material layer has proven to be unsuitable for high-nickel ternary materials.

The inventors have found that, the addition of an inorganic filler in safety coating of an electrode plate can stabilize the safety coating.

It has been found that in the case that when the safety coating does not contain an inorganic filler, the solvent (such as NMP or the like) in the positive electrode active material layer over the safety coating or the electrolyte will adversely dissolve and swell the polymer material in the safety coating, thus the safety coating will be damaged which will affect its PTC effect. After adding an inorganic filler to the safety coating, the inorganic filler as a barrier can advantageously eliminate the above-mentioned adverse effects such as dissolving and swelling, and thus it is advantageous for stabilizing the safety coating. In addition, it has also been found that the addition of the inorganic filler is also advantageous for ensuring that the safety coating is not easily deformed when the electrode plate is compacted. Therefore, the addition of the inorganic filler can well ensure that the safety coating is stably disposed between the metal current collector and the positive electrode active material layer and that the metal current collector is prevented from directly contacting with the positive electrode active material layer, thereby improving safety performance of the battery.

Surprisingly, the inventors have also found that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix material begins to expand, the spacing between the particles of the conductive materials increases, and the conductive network is partially blocked, so that the resistance of the safety coating increases gradually. When a certain temperature (for example the operating temperature) is reached, the conductive network is almost completely blocked, and the current approaches zero. However, usually when the inside of the safety coating reaches a dynamic balance, the conductive network will be partially recovered. Therefore, after reaching a certain temperature (for example the operating temperature), the resistance of the safety coating is not as large as expected, and still there is very little current flowing through. The inventors have found that after the inorganic filler is added and the volume of the polymer matrix material expands, both of the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. As a result, the safety performance of battery can be improved better.

In summary, the inorganic filler can function as stabilizing the safety coating from the following two aspects: (1) hindering the solvent (such as NMP, etc.) or the electrolyte in the positive electrode active material layer from causing adverse effects such as dissolving, swelling the polymer material in the safety coating; and (2) advantageously guaranteeing that the safety coating is not easily deformed during the plate compaction process.

Based on the total weight of the safety coating, the content of the inorganic filler is typically from 10 wt % to 60 wt %. If the content of the inorganic filler is too small, it will not be enough to stabilize the safety coating; if the content is too large, it will affect the PTC performance of the safety coating. The content of the inorganic filler is preferably from 15 wt % to 45 wt %.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

When the particle size of the first positive electrode active material is too small, the specific surface area increases, and the side reaction increases; when the particle size is too large, the coating thickness of the safety coating is too large and the thickness is uneven. Preferably, the average particle size D of the inorganic filler in the safety coating satisfies 100 nm≤D≤10 µm, and more preferably 1 µm≤D≤6 µm. When the particle size of the inorganic filler is in the above ranges, the effect of blocking the conductive network at a high temperature can be improved, thereby improving the response speed of the safety coating. Further preferably, the inorganic filler in the safety coating has a specific surface area (BET) of not more than 500 $m^2/g$. When the specific surface area of the inorganic filler increases, side reaction will increase and thus the battery performance will be affected. Moreover, in the case that the specific surface area of the inorganic filler is too large, a higher proportion of binder will be consumed, which will cause the binding force among the safety coating, the current collector and the positive electrode active material layer to be reduced and the growth rate of the internal resistance to be high. When the specific surface area (BET) of the inorganic filler is not more than 500 $m^2/g$, a better overall effect can be provided.

Especially, the inventors have found that in the case that the safety coating is used in a positive electrode plate, it is particularly advantageous when a positive electrode electrochemically active material or a conductive carbon coating modified above material, a conductive metal coating modified above material or a conductive polymer coating modified above material is used as the inorganic filler. In such a case, in addition to above mentioned functions as stabilizing the safety coating (hindering organic solvent from adverse effects such as dissolving or swelling the polymer material and ensuring that the safety coating is not easily deformed), and as improving the performance such as the response speed and the like of the safety coating, the inorganic filler may further play the following two roles:

(1) to improve the overcharge performance of the battery. In the PTC safety coating system composed of a fluorinated polyolefin and/or chlorinated polyolefin polymer matrix and a conductive material, since the electrochemically active material has the characteristics of lithium ion intercalation and de-intercalation, the electrochemically active material can be used as an "active site" in the conductive network at the normal operating temperature of the battery and thus the number of "active site" in the safety coating is increased. In the process of overcharging, the electrochemically active material will de-intercalate, and the de-intercalation process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem in battery. Thus the overcharge safety performance of the battery may be improved.

(2) to contribute to capacity of charge and discharge. Since the electrochemically active material can contribute to a certain capacity of charge and discharge at the normal operating temperature of the battery, the effect of the safety coating on the electrochemical performance such as capacity of the battery at the normal operating temperature can be minimized.

Therefore, for the positive electrode plate, it is the most preferred to use a positive electrode electrochemically active material or a conductive carbon coating modified electrochemically active material, a conductive metal coating modified electrochemically active material or a conductive polymer coating modified electrochemically active material as the inorganic filler of the safety coating.

The positive electrode electrochemically active material is preferably selected from at least one of lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, or a conductive carbon coating modified above material, a conductive metal coating modified above material or a conductive polymer coating modified above material. Especially, it is a conductive carbon coating modified electrochemically active material, such as a conductive carbon coating modified lithium cobalt oxide, a conductive carbon coating modified lithium nickel manganese cobalt oxide, a conductive carbon coating modified lithium nickel manganese aluminate, a conductive carbon coating modified lithium iron phosphate, a conductive carbon coating modified lithium vanadium phosphate, a conductive carbon coating modified lithium cobalt phosphate, a conductive carbon coating modified lithium manganese phosphate, a conductive carbon coating modified lithium manganese iron phosphate, a conductive carbon coating modified lithium iron silicate, a conductive carbon coating modified lithium vanadium silicate, a conductive carbon coating modified lithium cobalt silicate, a conductive carbon coating modified lithium manganese silicate, a conductive carbon coating modified spinel lithium manganese oxide, a conductive carbon coating modified spinel lithium nickel manganese oxide, a conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

Thus, by introducing inorganic filler, especially positive electrode electrochemically active material (or coating modified electrochemically active materials), into the safety coating of positive electrode plate, the performance of safety coating can be significantly improved, so that the safety coating can be useful in the application environment of high-nickel ternary materials.

In the present application, in addition to the inorganic filler, PTC safety coating also comprises a polymer matrix material (PTC matrix material), and a conductive material.

In the safety coating, the polymer matrix material may be a polyolefin material or other polymer materials such as polyethylene, polypropylene, ethylene-vinyl acetate copolymer (EVA), ethylene-acrylic acid copolymer, ethylene-methacrylic acid copolymer, polyamide, polystyrene, polyacrylonitrile, thermoplastic elastomer, epoxy resin, polyacetal, thermoplastic modified cellulose, polysulfone, polymethyl(meth) acrylate, a copolymer containing (meth) acrylate and the like. In addition, the safety coating may also contain a binder that promotes binding force between the polymer matrix material and the current collector. The binder may be for example PVDF, PVDC, SBR and the like, and also may be an aqueous binder selected from the group consisting of CMC, polyacrylate, polycarbonate, polyethylene oxide, rubber, polyurethane, sodium carboxymethyl cellulose, polyacrylic acid, acrylonitrile multicomponent copolymer, gelatin, chitosan, sodium alginate, a coupling agent, cyanoacrylate, a polymeric cyclic ether derivative, a hydroxy derivative of cyclodextrin, and the like.

In the conventional coating having PTC effect for use in batteries, polyethylene, polypropylene or ethylene propylene copolymer or the like is generally used as the PTC matrix material. In this case, it is typically necessary to additionally add a binder to the PTC matrix material and the conductive material. If the binder content is too small, the binding force between the coating and the metal current collector is poor; and if the binder content is too large, the response temperature and response speed of the PTC effect are affected. Fluorinated polyolefin and/or chlorinated polyolefin (such as PVDF) is conventionally used as a binder. When used as a binder, the content of PVDF is much less than the content of matrix material. For example, a content of the PVDF binder in conventional PTC coatings is typically less than 15% or 10%, or even less, relative to the total weight of the coating.

The inventors have found that, instead of using a conventional PTC matrix material such as polyethylene, polypropylene or ethylene propylene copolymer, a large amount of fluorinated polyolefin and/or chlorinated polyolefin is used between the metal current collector and the positive electrode active material layer, and can still function as a PTC thermistor layer; and the safety coating comprising fluorinated polyolefin and/or chlorinated polyolefin as a polymer matrix is more useful in the application environment of high-nickel ternary materials. Based on the total weight of the safety coating, the content of the fluorinated polyolefin and/or chlorinated polyolefin as the polymer matrix material is from 35 wt % to 75 wt %, which is much higher than the content of fluorinated polyolefin or chlorinated polyolefin such as PVDF usually used as a binder in the prior PTC thermistor layer.

In the present safety coating, the fluorinated polyolefin and/or chlorinated polyolefin material actually functions both as a PTC matrix and as a binder, which avoids the influence on the adhesion of the coating, the response speed, and the response temperature of the PTC effect due to the difference between the binder and the PTC matrix material.

Firstly, the safety coating composed of fluorinated polyolefin and/or chlorinated polyolefin material and a conductive material can function as a PTC thermistor layer and its operating temperature range is suitably from 80° C. to 160° C. Thus the high temperature safety performance of the battery may be improved well.

Secondly, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent (such as NMP or the like) or the electrolyte in the positive electrode active material layer over the safety coating may have an adverse effect such as dissolution, swelling and the like on the polymer material of the safety coating. For the safety coating containing PVDF in a conventional binder amount, the adhesion would be easily getting worse. For the safety coating containing relatively high amount of fluorinated polyolefin and/or chlorinated polyolefin, the above adverse effect is relatively low.

Thus, use of fluorinated polyolefin and/or chlorinated polyolefin as a polymer matrix material of PTC coating has special advantages, which helps to eliminate various defects faced by the prior PTC layer. For example, due to the good adhesion of the fluorinated polyolefin and/or chlorinated polyolefin matrix materials, when such polymer matrix materials are used, the safety coating does not have to contain other additional binders.

The fluorinated polyolefin and/or chlorinated polyolefin is preferably polyvinylidene fluoride (PVDF), polyvinylidene chloride (PVDC), modified PVDF, or modified PVDC. For example, the binder may be selected from at least one of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In a preferred embodiment of the present application, based on the total weight of the safety coating, the content of the fluorinated polyolefin and/or chlorinated polyolefin polymer matrix is from 35 wt % to 75 wt %. If the content is too small, the polymer matrix cannot ensure the safety coating works well in terms of its PTC effect; and if the content is too high, it will affect the response speed and the like of the safety coating. The content of the fluorinated polyolefin and/or chlorinated polyolefin polymer matrix is preferably from 40 wt % to 75 wt %, more preferably from 50 wt % to 75 wt %.

In addition, as a further improvement of the present application, the polymer matrix in the safety coating of the positive electrode plate is preferably subjected to crosslinking treatment. That is to say, it is polymer matrix material having a crosslinked structure, fluorinated polyolefin and/or chlorinated polyolefin having a crosslinked structure.

The crosslinking treatment may be more advantageous for hindering the adverse effects of a solvent (such as NMP or the like) in the positive electrode active material layer or an electrolyte on the polymer material in the safety coating, such as dissolving or swelling and the like, and for preventing the positive electrode active material layer from cracking due to uneven stress.

In addition, the polymer matrix which is not subjected to crosslinking treatment has a large swelling in the electrolyte, thus the introduction of safety coating will cause a large DCR (internal DC resistance) growth of battery, which is disadvantageous to improvement of the kinetic performance of battery. After being subjected to crosslinking treatment, the swelling ratio of the polymer matrix is effectively suppressed, so that the DCR growth due to introduction of the safety coating can be remarkably reduced.

The procedure of the crosslinking treatment is known in the art. For example, for fluorinated polyolefin and/or chlorinated polyolefin polymer matrix, the crosslinking treatment can be achieved by introducing an activator and a crosslinking agent. The function of the activator is to remove HF or HCl from fluorinated polyolefin and/or chlorinated polyolefin to form a C=C double bond; and the crosslinking agent acts to crosslink the C=C double bond. As an activator, a strong base-weak acid salt such as sodium silicate or potassium silicate can be used. A weight ratio of the activator to the polymer matrix is usually from 0.5% to 5%. The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), glyoxal, aziridine, olefinically unsaturated compounds (styrene, α-methylstyrene, acrylonitrile, acrylic acid, methacrylic acid, acrylates (1,4-butylene glycol diacrylate, ethylene glycol dimethacrylate, TAC, butyl acrylate, HEA, HPA, HEMA, HPMA, MMA)), organosilicons (ethyl orthosilicate, methyl orthosilicate, trimethoxysilane), benzenesulfonic acids (p-toluenesulfonic acid, p-toluenesulfonyl chloride), organic peroxides (dicumyl peroxide, bis(2,4-dichlorobenzoyl) peroxide), and metal organic compounds (aluminum isopropoxide, zinc acetate, titanium acetylacetonate).

A weight ratio of the crosslinking agent to the polymer matrix is from 0.01% to 5%. If the content of crosslinking agent is small, the crosslinking degree of the polymer matrix is low, which cannot eliminate cracking completely. If the content of crosslinking agent is too high, it is easy to cause gel during stirring. The activator and the crosslinking agent may be added after the stirring step of the slurry for preparing the safety coating is completed. After carrying out the crosslinking reaction, the mixture is uniformly stirred and then coated to prepare a safety coating.

The safety coating between the metal current collector and the positive electrode active material layer may further comprise conductive material. The conductive material may be selected from at least one of a conductive carbon-based material, a conductive metal material, and a conductive polymer material. As illustrative examples, the conductive carbon-based material may be selected from at least one of conductive carbon black, acetylene black, graphite, graphene, carbon nanotubes, carbon nanofibers; the conductive metal material is selected from at least one of Al powder, Ni powder, and gold powder; and the conductive polymer material may be selected from at least one of conductive polythiophene, conductive polypyrrole, and conductive polyaniline. The conductive material may be used alone or in combination of two or more.

In the present application, based on the total weight of the safety coating, the content of the conductive material is from 5 wt % to 25 wt %, preferably from 5 wt % to 20 wt %. Preferably, the weight ratio of the polymer matrix material to the conductive material is 2 or more. With such ratio, the safety performance during nail penetration can be further improved. If the weight ratio of the polymer matrix material to the conductive material is less than 2, the content of the conductive material is relatively high, and the conductive network may not be sufficiently broken at elevated temperature, thereby affecting the PTC effect. If the weight ratio of the polymer matrix material to the conductive material is too high, the content of the conductive material is relatively low, which causes a large increase in the DCR of the battery at normal operation. Preferably, the weight ratio of the polymer matrix to the conductive material is 8 or less. In a particular embodiment of the present application, the weight ratio of the polymer matrix to the conductive material is preferably 3 or more and 8 or less.

Conductive materials are typically used in the form of powders or granules. The particle size may be from 5 nm to 500 nm, for example, from 10 nm to 300 nm, from 15 nm to 200 nm, from 15 nm to 100 nm, from 20 nm to 400 nm, from 20 nm to 150 nm, or the like, depending on the specific application environment.

In addition to the polymer matrix, the conductive material, and the inorganic filler, the safety coating may also contain other materials or components, such as other binders that promote adhesion between the coating and the substrate for the current collector. Those skilled in the art can select other auxiliaries according to actual needs. For example, in other embodiments of the present application, the safety coating may also comprise other binders. In still other embodiments of the present application, the safety coating may further include other polymer matrix other than the above mentioned polymer matrix. When fluorinated polyolefin and/or chlorinated polyolefin is/are used as polymer matrix, since the polymer matrix itself used in the safety coating has a good adhesion, the safety coating is substantially free of other binders or other polymer matrixes other than the mentioned matrix material (in which the phrase "substantially free" means ≤3%, ≤1%, or ≤0.5%), in order to simplify the process and to save the cost.

Moreover, in some preferred embodiments of the present application, the safety coating may consist substantially of the polymer matrix, the conductive material, and the inorganic filler, which is free of a significant amounts (e.g., ≤3%, ≤1%), or ≤0.5%) of other components A thickness H of the safety coating can be reasonably determined according to actual needs. The thickness H of the safety coating is usually not more than 40 μm, preferably not more than 25 μm, more preferably not more than 20 μm, 15 μm or 10 μm. The thickness of the safety coating is usually greater than or equals to 1 μm, preferably greater than or equals to 2 μm, and more preferably greater than or equals to 3 μm. If the thickness is too small, it is not enough to ensure that the safety coating has the effect of improving safety performance of the battery; if it is too large, the internal resistance of the battery will increase seriously, which will affect electrochemical performance of the battery during normal operation. Preferably, 1 μm≤H≤20 μm, more preferably 3 μm≤H≤10 μm.

FIG. 1 shows a schematic structural view of a positive electrode plate according to some embodiments of this application, in which 10—a metal current collector; 14—a positive electrode active material layer; 12—a safety coating (i.e. a PTC safety coating).

It is easily understood that although the PTC safety coating and the positive electrode active material layer are provided only on one side of the positive electrode current collector 10 as described in FIG. 1, in other embodiments, the PTC safety coating 12 and the positive electrode active material layer 14 may be provided on both sides of the positive metal current collector 10, respectively.

In addition, the inventors have also found that in the positive electrode plate of the application, the safety coating not only increases its resistance when the temperature increases and takes PTC effect, it can also wrap metal burrs that may be generated in the current collector under abnormal conditions such as nail penetration, thereby preventing short circuit in the battery. In view of nail penetration safety performance, the safety of battery is greatly influenced by an elongation at break of the current collector. If the elongation at break of the current collector is too large, the metal burrs will be larger, which is not conducive to improving safety performance of the battery. If the elongation at break of the current collector is too small, breakage is likely to occur during processing such as plate compaction or when the battery is squeezed or collided, thereby degrading quality or safety performance of the battery. Therefore, in order to further improve safety performance, especially during nail penetration, the elongation at break δ of the current collector should be no more than 4% and not less than 0.8%. The elongation at break of the metal current collector can be adjusted by changing purity, impurity content and additives of the metal current collector, the billet production process, the rolling speed, the heat treatment process, and the like.

In the positive electrode plate of the application, for the metal current collector, common materials in the art, such as metal flakes or metal foils of stainless steel, aluminum, copper, titanium or the like can be used. The current collector may have a thickness of from 4 μm to 16 μm. Preferably, the current collector is a porous aluminum-containing current collector (for example, a porous aluminum foil). Use of a porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, use of a porous aluminum foil can also improve infiltration of the electrolyte to the electrode plate, and thereby improve the kinetic performance of the lithium ion battery. The safety coating can cover the surface of the porous aluminum foil to prevent miss coating of the upper active material layer during the coating process.

It has been found that the combination of a porous aluminum-containing current collector and an inorganic filler-containing safety coating is particularly suitable for high-nickel ternary materials. The safety performance of battery may be further improved, because the aluminum metal content per unit area in the thickness direction of battery core is reduced, and the safety coating can wrap the burrs generated in the current collector under abnormal conditions such as nail penetration, and the safety coating also has the PTC effect. In addition, the probability of severe aluminothermic reactions (aluminum-thermo reactions are a serious problem for high-nickel ternary materials) may also be reduced, so that the safety performance of battery may also be further improved. The thickness of the metal current collector is preferably from 4 μm to 16 μm. The percentage of pore area of the porous aluminum-containing current collector is preferably from 5% to 75%.

Although the composition of the upper active material layer of the positive electrode plate is not particularly limited in this application, the present application is particularly suitable for a positive electrode plate containing a high-nickel ternary material as a positive electrode active material. Therefore, in a preferred embodiment of the present application, the positive electrode active material layer comprises $Li_{1+x}Ni_aCo_bMe_{(1-a-b)}O_2$, wherein $-0.1 \leq x \leq 0.2$, $0.6 \leq a < 1$ (preferably, $0.8 \leq a < 1$), $0 < b < 1$, $0 < (1-a-b) < 1$, and wherein Me is selected from at least one of Mn, Al, Mg, Zn, Ga, Ba, Fe, Cr, Sn, V, Sc, Ti, and Zr (preferably Mn or Al). These materials are well known in the art, and the composition thereof and the methods for making them are also well known in the art. Of course, the positive electrode active material layer may comprise several positive electrode active materials. For example, in addition to the above $Li_{1+x}Ni_aCo_bMe_{(1-a-b)}O_2$, the positive electrode active material layer may further comprise one or more of $LiCoO_2$, $LiNiO_2$, $LiMn_2O_4$, $LiFePO_4$, and the like. Other materials in the positive electrode active material layer (e.g., binders, conductive agents, and optionally other additives) are conventionally selected by those skilled in the art.

The safety coating and the positive electrode active material layer are tightly bonded together and are not easy to distinguish in appearance, after being formed on the current collector respectively. A whole coating will be obtained generally if the coating is peeled off from the current collector. Therefore, the safety coating and the positive electrode active materials are collectively referred to as a film layer.

The inventors have found that the safety performance of the battery during nail penetration will also be greatly influenced by the elongation of the film layer of the present application.

As a further improvement of the present application, the film layer has an elongation of 30% or more, preferably 80% or more. The advantage of larger elongation is that in the abnormal situation such as nail penetration, the film layer with larger elongation can wrap metal burrs that may be generated in the current collector to prevent the occurrence of short circuit in the battery, thereby greatly improving the safety performance of the battery during nail penetration. For the conventional positive electrode active material layer, its elongation is generally not more than 1%, and it cannot function to wrap metal burrs. In the present application, the elongation of the film layer is greatly improved due to the introduction of the safety coating.

If the content of the polymer matrix in the safety coating is increased, it is inevitably beneficial to the increase of the elongation of the film layer. However, if the content of the polymer matrix in the safety coating is too large, the content of the conductive material will be relatively low, thereby causing a large increase in DCR of the battery during normal operation. Therefore, it is preferred that the film layer has an elongation of 80% or more and 300% or less.

Preferably, the single side thickness of the film layer is from 30 μm to 80 μm.

Further, the binding force between the film layer and the current collector is preferably 10 N/m or more. Larger binding force can improve the safety performance of the battery during nail penetration. For example, the binding force between the safety coating and the current collector can be increased by introducing an additional binder or by carrying out crosslinking treatment to the polymer matrix, for example to increase the binding force between the film layer and the current collector.

The negative electrode plate for use in conjunction with the positive electrode plate of the present application may be selected from various conventional negative electrode plates in the art, and the constitution and preparation thereof are well known in the art. For example, the negative electrode plate may comprise a negative electrode current collector and a negative electrode active material layer disposed on the negative electrode current collector, and the negative electrode active material layer may comprise a negative electrode active material, a binder, a conductive material, and the like. The negative electrode active material is, for example, a carbonaceous material such as graphite (artificial graphite or natural graphite), conductive carbon black, carbon fiber, or the like; a metal or a semimetal material such as Si, Sn, Ge, Bi, Sn, In, or an alloy thereof; and a lithium-containing nitride or a lithium-containing oxide, a lithium metal or a lithium aluminum alloy.

The present application also discloses an electrochemical device comprising the positive electrode plate according to the present application. The electrochemical device may be a capacitor, a primary battery, or a secondary battery. For example, it may be a lithium ion capacitor, a lithium ion primary battery, or a lithium ion secondary battery. In addition to the use of the positive electrode plate of the present application, the construction and preparation methods of these electrochemical devices are known per se. The electrochemical device can have improved safety (e.g. nail penetration safety) and electrical performances due to the use of the positive electrode plate of the present application.

Figure 2:
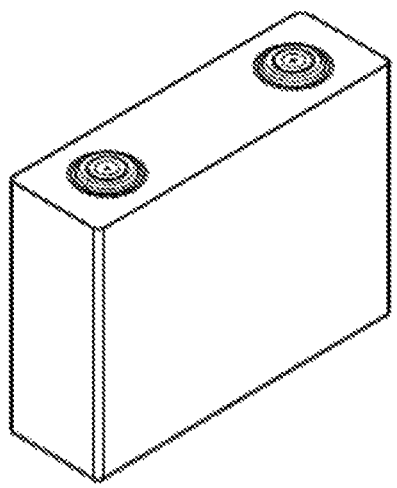
FIG. 2 is a perspective view of an embodiment of a lithium ion secondary battery.
Figure 3:
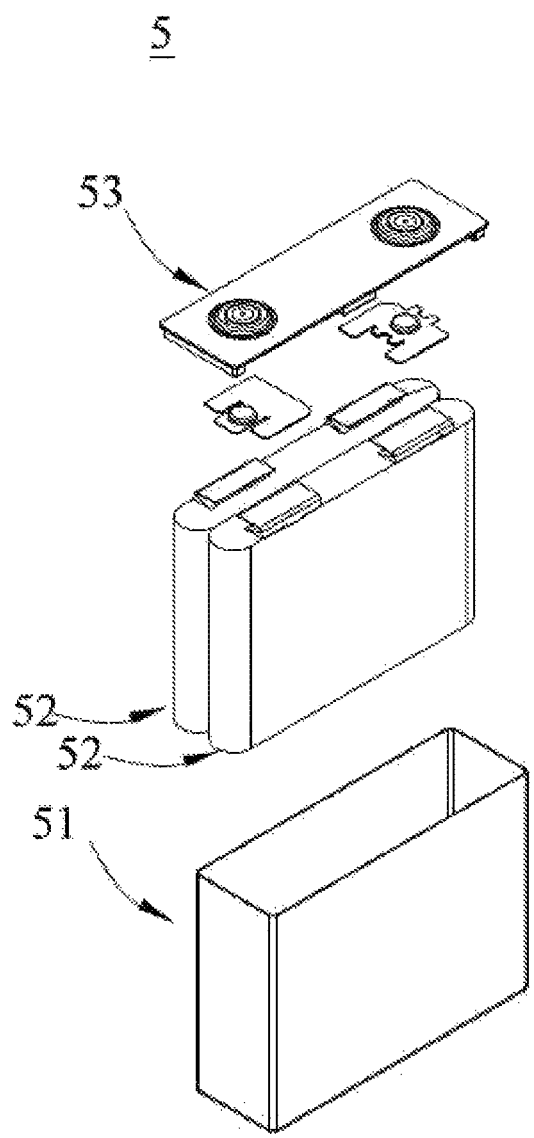
FIG. 3 is an exploded view of FIG. 2.

In a particular embodiment of the application, the electrochemical device is a lithium ion battery. FIG. 2 is a perspective view of an embodiment of a lithium ion battery 5. FIG. 3 is an exploded view of FIG. 2. Referring to FIG. 2 and FIG. 3, a lithium ion battery 5 includes a case 51, an electrode assembly 52, a top cover assembly 53, and an electrolyte (not shown).

The electrode assembly 52 is packed in the case 51. The number of electrode assembly 52 is not limited and may be one or more. The electrode assembly 52 includes a positive electrode plate, a negative electrode plate, and a separator. The separator separates the positive electrode plate from the negative electrode plate. The electrolyte is injected into the case 51 and impregnating the electrode assembly 52, which includes, for example, a first electrode plate, a second electrode plate and a separator.

Please be noted that the lithium ion battery 5 shown in FIG. 2 is a can-type battery, but is not limited thereto. The lithium ion battery 5 may be a pouch-type battery, i.e. the case 51 is replaced by a metal plastic film and the top cover assembly 53 is eliminated.

Next, a battery module of still another aspect of the present application will be described.

Figure 4:
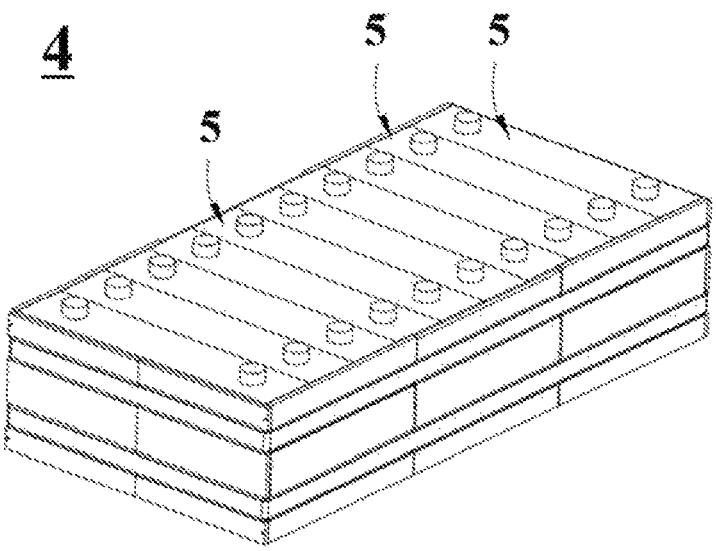
FIG. 4 is a perspective view of an embodiment of a battery module.

FIG. 4 is a perspective view of an embodiment of the battery module 4.

The battery module 4 provided by the embodiment of the present application includes the lithium ion battery 5 according to the present application.

Referring to FIG. 4, the battery module 4 includes a plurality of batteries 5. A plurality of lithium ion batteries 5 are arranged in the longitudinal direction. The battery module 4 can function as a power source or an energy storage device. The number of the lithium ion batteries 5 in the battery module 4 can be adjusted according to the application and capacity of the battery module 4.

Next, a battery pack of still another aspect of the present application will be described.

Figure 5:
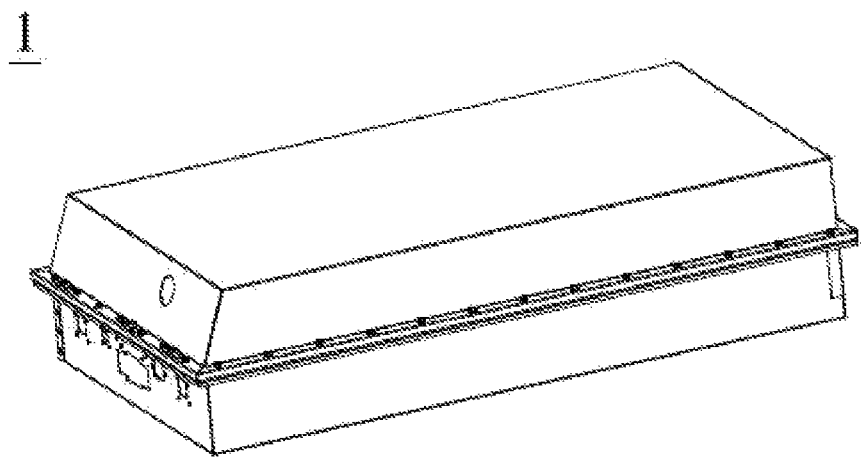
FIG. 5 is a perspective view of an embodiment of a battery pack.
Figure 6:
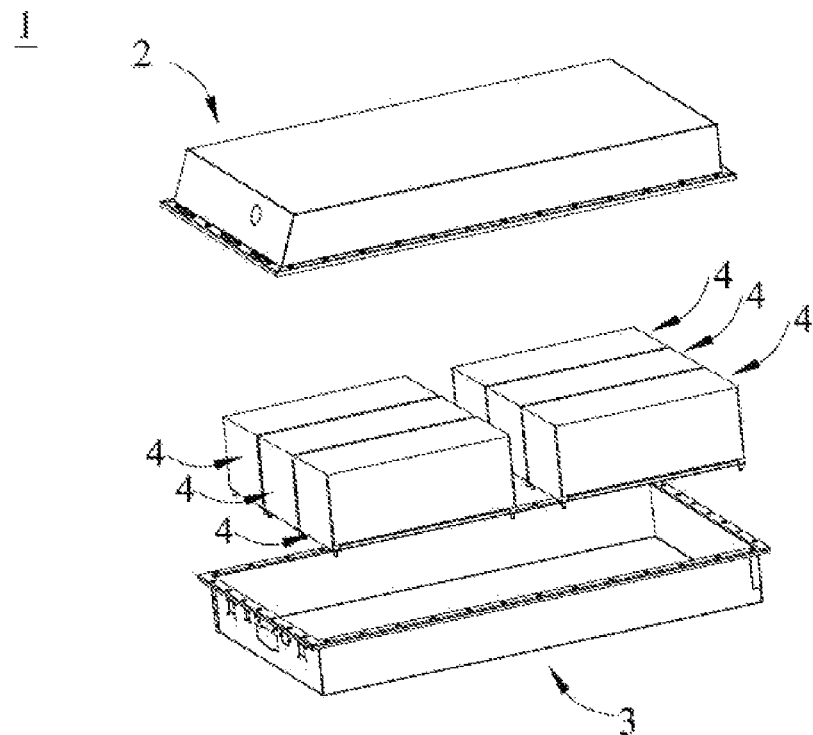
FIG. 6 is an exploded view of FIG. 5.

FIG. 5 is a perspective view of an embodiment of the battery pack 1. FIG. 6 is an exploded view of FIG. 5.

The battery pack 1 provided by the present application includes the battery module 4 according to an embodiment of the present application.

Specifically, referring to FIG. 5 and FIG. 6, the battery pack 1 includes an upper cabinet body 2, a lower cabinet body 3, and a battery module 4. The upper cabinet body 2 and the lower cabinet body 3 are assembled together and form a space in which the battery module 4 is packed. The battery module 4 is placed in the space of the upper cabinet body 2 and the lower cabinet body 3 which are assembled together. The output polar of the battery module 4 is passed between one or both of the upper cabinet body 2 and the lower cabinet body 3 to supply power to the outside or to be externally charged. The number and arrangement of the battery modules 4 used in the battery pack 1 can be determined according to actual needs.

Next, a device of still another aspect of the present application will be described.

Figure 7:
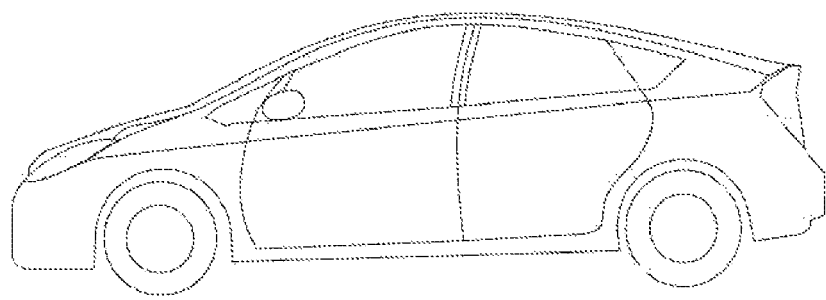
FIG. 7 is a schematic view showing an embodiment of a device wherein a lithium ion battery is used as a power source.

FIG. 7 is a schematic view showing an embodiment of a device wherein a lithium ion battery is used as a power source.

The device provided by the present application includes at least one of the battery 5, the battery module 4, or the battery pack 1. The lithium ion battery 5, the battery module 4, or the battery pack 1 can be used as a power source of the device. In FIG. 7, the device using the battery pack 1 is an electric car. Of course, it is not limited thereto, and the device using the battery 5, the battery module 4, or the battery pack 1 may be any electric vehicles (for example, an electric bus, an electric tram, an electric bicycle, an electric motorcycle, an electric scooter, an electric golf cart, an electric truck) other than the electric car, electric ships, electric tools, electronic equipment and energy storage systems. The electric vehicle can be a pure electric vehicle, a hybrid electric vehicle, or a plug-in hybrid electric vehicle.

Those skilled in the art will understand that various definitions or preferred ranges of the components, component amounts, and material physicochemical properties (thickness, particle size, specific surface area, elongation at break, etc.) in the various embodiments of the present application as mentioned above can be combined arbitrarily. The combined embodiments are still within the scope of the invention and are considered as part of the disclosure.

EXAMPLE

In order to make the objects, the technical solutions and the beneficial technical effects of the present application more clear, the present application will be described in further detail below with reference to the embodiments. However, it is to be understood that embodiments of the present application are only intended to be illustrative of the present application, and are not intended to limit the application, and embodiments of the present application are not limited to those embodiments given in the specification. The experimental conditions not indicated in the examples may refer to conventional conditions, or the conditions recommended by the material supplier or equipment supplier.

1. Preparation Method
1.1 Preparation of Positive Electrode Plate
1) Safety Coating Depending on whether or not the polymer matrix material in the safety coating is subjected to crosslinking treatment, the safety coating was prepared by one of the following two methods.

For the polymer matrix without cross-linking treatment:
A certain ratio of a polymer matrix material, a conductive material, and an inorganic filler were mixed with N-methyl-2-pyrrolidone (NMP) as a solvent with stirring uniformly, which was then coated on both sides of metal current collector, followed by drying at 85° C. to obtain a PTC layer, i.e. a safety coating.

For the polymer matrix with cross-linking treatment:
A certain ratio of a polymer matrix material, a conductive material, an inorganic filler, and a crosslinking agent were mixed with N-methyl-2-pyrrolidone (NMP) as a solvent with stirring uniformly and then an activator (sodium silicate) and a crosslinking agent were added with stirring uniformly. The resulting mixture was then coated on both sides of metal current collector, followed by drying at 85° C. to obtain a PTC layer, i.e. a safety coating.

2) Positive Electrode Active Material Layer

Then, 90 wt % of a positive electrode active material, 5 wt % of SP, and 5 wt % of PVDF were mixed with NMP as a solvent with stirring uniformly, which was then coated on the safety coating of the current collector as prepared according to the above method followed by drying at 85° C. to obtain a positive electrode active material layer.

3) Work Up

Then, the current collector with two positive electrode active material layers was cold-pressed, then trimmed, cut, and stripped, followed by drying under vacuum at 85° C. for 4 hours. After welding, the positive electrode plate meeting the requirements of the secondary battery was obtained.

The main materials used in the specific examples were as follows:

Binder: PVDF (Manufacturer "Solvay", model 5130), PVDC;

Crosslinking agent: acrylonitrile, tetraisocyanate, polyethylene glycol;

Conductive material (conductive agent): Super-P (TIMCAL, Switzerland, abbreviated as SP);

Positive electrode active material: $LiNi_{0.8}Co_{0.1}Mn_{0.1}O_2$ (NCM811).

Inorganic filler: alumina, lithium iron phosphate (abbreviated as LFP), carbon coating modified lithium iron phosphate (abbreviated as LFP/C), carbon coating modified lithium titanate (abbreviated as $Li_4Ti_5O_{12}/C$);

Current collector: porous aluminum foil (thickness 12 μm, pore area accounts for 32%), non-porous ordinary aluminum foil (thickness 12 μm).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1 mol/L to prepare an electrolyte.

1.4 Preparation of the Battery

A polypropylene film with a thickness of 12 μm was used as a separator, and the positive electrode, the separator and the negative electrode were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery core was charged to 3.8V with a constant current of 0.1 C, thereby completing the preparation of the secondary battery.

2. Tests for Material Performances

In each of the examples and comparative examples, the physical property parameters of the materials were measured by a commonly known method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2/g$.

2.3 Binding Force between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by the width of the sample, i.e. 0.02 m, to calculate the binding force (N/m).

2.4 Elongation at Break of Current Collector

Two samples having a length of 200 mm and a width of 15 mm were taken from the current collector. For each sample, the values of the thickness h (μm) of sample were measured by using a micrometer. The sample was then mounted on a tensile machine (model AI7000) and stretched at a speed of 50 mm/min. The average of the two tests was used as the test result. The initial length L0 was recorded. The tensile machine was started, until the sample broke. The displacement L1 of the sample at the time of the break was read from the tensile machine. Elongation at break=(L1−L0)/L0*100%.

2.5 Thickness of Current Collector, Thickness of Coating and Thickness of Film Layer Thickness of the current collector was measured by a micrometer, and the average value of 5 points was used.

Thickness of coating and thickness of film layer: first measure the thickness of the current collector, and then measure the total thickness after coating, and calculate the difference between the two values as the coating thickness. A similar method was used for the thickness of film layer.

2.6 Cracking of the Coating

After drying and obtaining a positive electrode active material layer, if no cracks were observed in the 100 $m^2$ electrode plate, it was defined as no cracking; if the number of occurrences of cracks in 100 $m^2$ electrode plate was ≤3, it was defined as mild cracking; if the number of occurrences of cracks in 100 $m^2$ electrode plate was >3, it was defined as severe cracking.

2.7 Elongation of Film Layer

Removal of the current collector from the electrode plate: take the positive electrode plate out of the battery core and add the electrolyte, so that the electrode plate was completely soaked in the electrolyte, which was stored at 90° C. for more than 48 h, and then taken out. After that, the film layer of the positive electrode plate can be peeled off from the current collector.

The resulting film layer was used to prepare a sample having a width of 20 mm and a length of 50 mm wherein the thickness h of the sample was measured by micrometer in μm. The sample was then mounted on a tensile machine (model AI7000) and stretched at 50 mm/min. Start the tensile test until the sample breaks. The initial length L0 was recorded. The displacement L1 of the sample at break was read from the tensile machine. The elongation=(L1−L0)/L0*100%.

3. Tests for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging for 1 hour, the charging was terminated.

3.3 Cycle Performance Test:

The test conditions of the cycle number were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In this application, for convenience of comparison, the DCR of the battery core with uncrosslinked PVDF matrix was used as a reference, and was recorded as 100%, and the DCR of the other battery cores and the ratios thereof were calculated and recorded.

4. Performance Test Results 4.1 Protection Performance (PTC Effect) of Safety Coating and Effect thereof on Battery Performance In order to confirm the protection performance of safety coating, the corresponding safety coating, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The final test results were averaged and shown in Table 1-2.

In the test, the conventional electrode plate CPlate P was prepared with the method described in "1.1 Preparation of positive electrode plate", but the safety coating was not provided. That is to say, a positive electrode active material was directly applied over the current collector. The conventional electrode plate Cplate N was prepared according to the method described in "1.2 Preparation of negative electrode plate".

TABLE 1-2

| | Performance of lithium ion battery | | |
|---|---|---|---|
| Battery No. | Positive electrode | Negative electrode | Puncture Test |
| Battery 1 | CPlate P | CPlate N | 10 fail |
| Battery 2 | Comp. Plate CP | CPlate N | 2 pass, 8 fail |
| Battery 3 | Plate 1 | CPlate N | 10 pass |
| Battery 4 | Plate 2 | CPlate N | 10 pass |

TABLE 1-3

| | Performance of lithium ion battery | | | |
|---|---|---|---|---|
| Battery No. | Positive electrode | Negative electrode | DC resistance growth rate@130° C., 1 h | DC resistance growth rate@130° C., 2 h |
| Battery 2 | Comp. Plate CP | CPlate N | 20% | 30% |
| Battery 4 | Plate 2 | CPlate N | 1200% | 1500% |

The data in Table 1-1 and Table 1-2 indicated that the safety coating with PVDF or PVDC as a polymer matrix significantly improves the safety performance of the battery during nail penetration, especially in the case that an inorganic filler is added. The growth of DCR data in Table 1-3 indicated that the safety coating composed of PVDF and a conductive material does have a PTC effect, and the addition of the inorganic filler significantly improves the DCR growth of the battery at a high temperature, that is, the PTC effect is more remarkable.

4.2 Effect of the Content of Each Component Contained in the Safety Coating

In order to further study the effect of the content of each component contained in the safety coating, the corresponding safety coating, positive electrode plate, negative electrode plate and battery were prepared with the specific materials and amounts listed in Table 2-1 below according to the methods and procedures described in "1. Preparation method", and then were tested according to the method specified in "3. Tests for battery performance". In order to ensure the accuracy of data, 4 samples were prepared for each battery (10 samples for the puncture test or overcharge test) and tested independently. The final test results were averaged and shown in Table 2-2.

TABLE 1-1

| | Compositions of electrode plate | | | | | | | | |
|---|---|---|---|---|---|---|---|---|---|
| | | | Composition of the safety coating | | | | | | |
| | Current collector | Positive electrode active material | Polymer matrix material | wt % | Conductive material | wt % | Inorganic filler material | wt % | Thickness H of safety coating (μm) |
| CPlate P | Al foil | NCM811 | / | / | / | / | / | / | / |
| Comp. Plate CP | Al foil | NCM811 | uncrosslinked PVDF | 90 | SP | 10 | / | / | 20 |
| Plate 1 | Al foil | NCM811 | uncrosslinked PVDC | 35 | SP | 10 | alumina | 55 | 10 |
| Plate 2 | Al foil | NCM811 | uncrosslinked PVDF | 35 | SP | 10 | LFP | 55 | 3 |

TABLE 2-1

Compositions of electrode plate

| | Current collector | Positive electrode active material | Composition of the safety coating | | | | | | Thickness of safety coating H (μm) |
|---|---|---|---|---|---|---|---|---|---|
| | | | Polymer matrix material | wt % | Conductive material | wt % | Inorganic filler material | wt % | |
| Comp. Plate 2-1 | Al foil | NCM811 | uncrosslinked PVDF | 75 | SP | 20 | alumina | 5 | 8 |
| Plate 2-2 | Al foil | NCM811 | uncrosslinked PVDF | 75 | SP | 15 | alumina | 10 | 8 |
| Plate 2-3 | Al foil | NCM811 | uncrosslinked PVDF | 75 | SP | 10 | alumina | 15 | 8 |
| Plate 2-4 | Al foil | NCM811 | uncrosslinked PVDF | 60 | SP | 10 | alumina | 30 | 8 |
| Plate 2-5 | Al foil | NCM811 | uncrosslinked PVDF | 60 | SP | 8 | alumina | 32 | 8 |
| Plate 2-6 | Al foil | NCM811 | uncrosslinked PVDF | 55 | SP | 15 | alumina | 30 | 8 |
| Plate 2-7 | Al foil | NCM811 | uncrosslinked PVDF | 50 | SP | 25 | alumina | 25 | 8 |
| Plate 2-8 | Al foil | NCM811 | uncrosslinked PVDF | 40 | SP | 15 | alumina | 45 | 8 |
| Plate 2-9 | Al foil | NCM811 | uncrosslinked PVDF | 35 | SP | 5 | alumina | 60 | 8 |
| Comp. Plate 2-10 | Al foil | NCM811 | uncrosslinked PVDF | 25 | SP | 5 | alumina | 70 | 8 |

TABLE 2-2

Performance of lithium ion batteries

| Battery | Positive electrode | Negative electrode | Puncture Test | Cycle Life (cycle) |
|---|---|---|---|---|
| Battery6 | Comp. Plate 2-1 | CPlate N | 5 fail, 5 pass | 2502 |
| Battery7 | Plate 2-2 | CPlate N | 10 pass | 2351 |
| Battery8 | Plate 2-3 | CPlate N | 10 pass | 2205 |
| Battery9 | Plate 2-4 | CPlate N | 10 pass | 2251 |
| Battery10 | Plate 2-5 | CPlate N | 10 pass | 2000 |
| Battery11 | Plate 2-6 | CPlate N | 10 pass | 2408 |
| Battery12 | Plate 2-7 | CPlate N | 10 pass | 2707 |
| Battery13 | Plate 2-8 | CPlate N | 10 pass | 2355 |
| Battery14 | Plate 2-9 | CPlate N | 10 pass | 1800 |
| Battery15 | Comp. Plate 2-10 | CPlate N | 4 fail, 6 pass | 1715 |

The data in Table 2-1 and Table 2-2 show that: (1) If the content of the inorganic filler is too low, the stability of the safety coating is not high, so safety performance of the battery cannot be fully improved; if the content of the inorganic filler is too high, the content of the polymer matrix is too low, so that the safety coating cannot exert its effect; (2) the conductive material has a great influence on the internal resistance and polarization of the battery, so it would affect the cycle life of the battery. The higher the content of the conductive material, the smaller the internal resistance and polarization of the battery is so that the cycle life will be better.

It had been found through experiments that the appropriate content range of each component in the safety coating is as follows:

the content of the polymer matrix is 35 wt % to 75 wt %;

the content of the conductive material is 5 wt % to 25 wt %; and the content of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performances of the electrode plate and the battery, the corresponding safety coating, positive electrode plate, negative electrode plate and battery were prepared with the specific materials and amounts listed in Table 3-1 below according to the methods and procedures described in "1. Preparation method", and were tested according to the method specified in "3. Tests for battery performance". In order to ensure accuracy of data, 4 samples were prepared for each battery (10 samples for the puncture test or overcharge test) and tested independently. The final test results were averaged which were shown in Table 3-2.

TABLE 3-1

Compositions of electrode plate

| | Current collector | Positive electrode active material | Polymer matrix Material | wt % | Conductive material Material | wt % | Inorganic filler Material | wt % | Carbon content (wt %) | Thickness H of safety coating (μm) |
|---|---|---|---|---|---|---|---|---|---|---|
| Plate 2-41 | Al foil | NCM811 | uncrosslinked PVDF | 60 | SP | 10 | alumina | 30 | / | 8 |
| Plate 2-42 | Al foil | NCM811 | uncrosslinked PVDF | 60 | SP | 10 | LFP | 30 | / | 8 |
| Plate 2-43 | Al foil | NCM811 | uncrosslinked PVDF | 60 | SP | 10 | LFP/C | 30 | 1 | 8 |
| Plate 2-44 | Al foil | NCM811 | uncrosslinked PVDF | 60 | SP | 10 | LFP/C | 30 | 2 | 8 |
| Plate 2-45 | Al foil | NCM811 | uncrosslinked PVDF | 60 | SP | 10 | LFP/C | 30 | 3 | 8 |
| Plate 2-46 | Al foil | NCM811 | uncrosslinked PVDF | 60 | SP | 10 | $Li_4Ti_5O_{12}$/C | 30 | 5 | 8 |

TABLE 3-2

Performances of lithium ion batteries

| Battery | Positive electrode | Negative electrode | Puncture Test | Overcharge Test | Cycle test (cycle) |
|---|---|---|---|---|---|
| Battery 46 | Plate2-41 | CPlate N | 10 pass | No pass | 2200 |
| Battery 47 | Plate2-42 | CPlate N | 10 pass | 10 pass | 2300 |
| Battery 48 | Plate2-43 | CPlate N | 10 pass | 10 pass | 2500 |
| Battery 49 | Plate2-44 | CPlate N | 10 pass | 10 pass | 2700 |
| Battery 50 | Plate2-45 | CPlate N | 10 pass | 10 pass | 2900 |
| Battery 51 | Plate2-46 | CPlate N | 10 pass | 10 pass | 3000 |

The data in Tables 3-1 and 3-2 show that compared to other materials (such as alumina), the electrochemically active material significantly improves the overcharge safety performance of the battery. In addition, carbon coating modified electrochemically active material also improves the cycle life of the battery.

4.4 Effect of Crosslinking on Battery Performance

The corresponding safety coating, positive electrode plate, negative electrode plate and battery were prepared with the specific materials and amounts listed in Table 4-1 below according to the methods and procedures described above, and were tested according to the specified method to study the effect of the crosslinking on coating cracking and DCR.

TABLE 4-1

Effect of crosslinking agent

| | Current collector | positive electrode active material | The first polymer matrix material | wt % | The first conductive material | wt % | The first positive electrode active material | wt % | Crosslinking agent type | Ratio to the polymer material | Thickness of the underlying layer H (μm) | Cracking (coating speed 50 m/min) |
|---|---|---|---|---|---|---|---|---|---|---|---|---|
| Plate 2-51 | Al foil | NCM811 | uncrosslinked PVDF | 60 | SP | 10 | LFP/C | 30 | No | 0 | 8 | Severe cracking |
| Plate 2-52 | Al foil | NCM811 | crosslinked PVDF | 60 | SP | 10 | LFP/C | 30 | acrylonitrile | 0.01% | 8 | Mild cracking |
| Plate 2-53 | Al foil | NCM811 | crosslinked PVDF | 60 | SP | 10 | LFP/C | 30 | tetraisocyanate | 0.1% | 8 | No cracking |
| Plate 2-54 | Al foil | NCM811 | crosslinked PVDF | 60 | SP | 10 | LFP/C | 30 | polyethylene glycol | 0.5% | 8 | No cracking |
| Plate 2-55 | Al foil | NCM811 | crosslinked PVDF | 60 | SP | 10 | LFP/C | 30 | acrylonitrile | 1.5% | 8 | No cracking |
| Plate 2-56 | Al foil | NCM811 | crosslinked PVDF | 60 | SP | 10 | LFP/C | 30 | acrylonitrile | 5% | 8 | No cracking |
| Plate 2-57 | Al foil | NCM811 | uncrosslinked PVDC | 60 | SP | 10 | LFP/C | 30 | No | No | 8 | Severe cracking |
| Plate 2-58 | Al foil | NCM811 | crosslinked PVDC | 60 | SP | 10 | LFP/C | 30 | acrylonitrile | 3% | 8 | No cracking |

In the case where the coating speed of the positive electrode active material layer was 50 m/min, the polymer matrix of the electrode plate 2-51 was not crosslinked by adding a crosslinking agent, and thus there was a severe cracking on the electrode plate. The addition of a crosslinking agent had a significant effect on improving the cracking of the electrode plate. No cracking occurred in the electrode plate 2-53 to the electrode plate 2-56. Similar experiments were performed for PVDC (electrode plates 2-57 and 2-58) and the results were similar. It can be seen that the addition of the crosslinking agent significantly eliminates the coating cracking of the electrode plate.

battery, the corresponding positive electrode plates, negative electrode plates and batteries (however, the materials of current collectors were altered) were prepared with the specific materials and amounts listed in Table 5-1 below according to the methods and procedures described in "1. Preparation method", and were tested according to the method specified in "3. Tests for battery performance".

In order to ensure accuracy of data, 4 samples were prepared for each battery (20 samples for the puncture test) and tested independently. The final test results were averaged and shown in Table 5-2.

TABLE 5-1

Composition and performance of electrode plates

| | Current collector | Positive electrode active material | Polymer matrix material | wt % | Conductive material | wt % | Inorganic filler material | wt % | Crosslinking agent type | Ratio to the polymer matrix | Thickness H of the safety coating (μm) |
|---|---|---|---|---|---|---|---|---|---|---|---|
| Plate 2-55 | Al foil | NCM811 | Uncrosslinked PVDF | 60 | SP | 10 | LFP/C | 30 | Acrylonitrile | 1.5% | 8 |
| Plate 2-65 | Porous Al foil | NCM811 | Crosslinked PVDF | 60 | SP | 10 | LFP/C | 30 | Acrylonitrile | 1.5% | 8 |

TABLE 4-2

Performance of lithium ion battery

| Battery | Positive electrode | Negative electrode | DCR of the battery | Puncture Test |
|---|---|---|---|---|
| Battery 52 | Plate 2-51 | CPlate N | 100% | 10 pass |
| Battery 53 | Plate 2-52 | CPlate N | 80% | 10 pass |
| Battery 54 | Plate 2-53 | CPlate N | 85% | 10 pass |
| Battery 55 | Plate 2-54 | CPlate N | 78% | 10 pass |
| Battery 56 | Plate 2-55 | CPlate N | 75% | 10 pass |
| Battery 57 | Plate 2-56 | CPlate N | 84% | 10 pass |

For the electrode plate 2-51, the polymer matrix was not crosslinked by adding a crosslinking agent, and thus the polymer matrix was swelled greatly in the electrolyte, resulting in a large DCR. The addition of the crosslinking agent can reduce the swelling of the polymer matrix in the electrolyte, and had a significant effect on reducing DCR. It can be seen that the addition of the crosslinking agent can significantly reduce the DCR of the battery.

In addition, the above data indicated that PVDF/PVDC can be used as the polymer matrix of PTC layer regardless of crosslinking, and the obtained battery had high safety performance in which the test result of puncture test is excellent, which indicated that the crosslinking treatment did not adversely affect the protective effect of the safety coating. Furthermore, compared with the uncrosslinked PVDC/PVDF, the crosslinking treatment improved the cracking of the electrode plate, from severe cracking to no cracking or mild cracking. The crosslinking treatment reduces the swelling of the polymer matrix in the electrolyte, thereby reducing the DCR by 15% to 25%, thereby improving the electrical properties of the battery.

4.5 Effect of Porous or Non-Porous Current Collector on Battery Performance

In order to further study the effect of porous or non-porous current collector on the performance of electrode plate and

TABLE 5-2

Performance of lithium-ion battery

| Battery | Positive electrode | Negative electrode | Puncture Test | Cycle Life (cycle) |
|---|---|---|---|---|
| Battery 56 | Plate 2-55 | CPlate N | 2 fail, 18 pass | 2100 |
| Battery 66 | Plate 2-65 | CPlate N | 20 pass | 2700 |

The data in Tables 5-1 and 5-2 indicated that the choice of whether the current collector was porous has an impact on the performance and safety of the battery. Compared with ordinary aluminum foil, the use of porous aluminum foil can further improve the safety performance (increasing the pass rate of the puncture test) and also improve the cycle life.

Based on the above experimental data, it can be seen that: addition of inorganic filler to PTC safety coating eliminates some inherent defects of traditional PTC safety coating and improves battery performance; the combination of such addition with the selection of a specific current collector can greatly improve the electrical performance and safety of the NCM811 battery, thereby paving the way for commercial application of NCM811 and other high-nickel materials.

It will be understood by those skilled in the art that the above implementation examples of positive electrode plates of this application are only exemplified to be used for a lithium battery, but the positive electrode plates of this application can also be applied to other types of batteries or electrochemical devices, and still may produce good technical effects of this application.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A positive electrode plate, comprising a metal current collector (10), a positive electrode active material layer (14) and a safety coating (12) disposed between the metal current collector (10) and the positive electrode active material layer (14); wherein: the safety coating (12) comprises a polymer matrix, a conductive material and an inorganic filler; the polymer matrix is fluorinated polyolefin and/or chlorinated polyolefin having a crosslinked structure;

in the safety coating (12), based on the total weight of the polymer matrix, the conductive material and the inorganic filler,
a content of the inorganic filler is from 10 wt % to 60 wt %,
a content of the polymer matrix is from 35 wt % to 75 wt %,
a content of the conductive material is from 5 wt % to 25 wt %;
the positive electrode active material layer (14) comprises $Li_{1+x}Ni_aCo_bMe_{(1-a-b)}O_2$, wherein $-0.1 \leq x \leq 0.2$, $0.6 \leq a < 1$, $0 < b < 1$, $0 < (1-a-b) < 1$, and Me is at least one of Mn, Al, Mg, Zn, Ga, Ba, Fe, Cr, Sn, V, Sc, Ti and Zr; and the metal current collector (10) is a porous aluminum-containing current collector.

2. The positive electrode plate according to claim 1, wherein the polymer matrix is selected from at least one of polyvinylidene fluoride, carboxylic acid modified polyvinylidene fluoride, acrylic acid modified polyvinylidene fluoride, polyvinylidene chloride, carboxylic acid modified polyvinylidene chloride, acrylic acid modified polyvinylidene chloride, polyvinylidene fluoride copolymer, and polyvinylidene chloride copolymer.

3. The positive electrode plate according to claim 1, wherein the conductive material is selected from at least one of a conductive carbon-based material, a conductive metal material, and a conductive polymer material.

4. The positive electrode plate according to claim 3, wherein the conductive carbon-based material is selected from at least one of conductive carbon black, acetylene black, graphite, graphene, carbon nanotubes, and carbon nanofibers; and/or the conductive metal material is selected from at least one of Al powder, Ni powder, and gold powder; and/or the conductive polymer material is selected from at least one of conductive polythiophene, conductive polypyrrole, and conductive polyaniline.

5. The positive electrode plate according to claim 1, wherein the inorganic filler may be selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

6. The positive electrode plate according to claim 5, wherein the inorganic filler in the safety coating (12) is selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, lithium titanate, or a conductive carbon coating modified above material, a conductive metal coating modified above material or a conductive polymer coating modified above material.

7. The positive electrode plate according to claim 5, wherein the inorganic filler has an average particle size D of $100 \text{ nm} \leq D \leq 10 \text{ } \mu m$.

8. The positive electrode plate according to claim 5, wherein the inorganic filler has a specific surface area of not more than 500 $m^2/g$.

9. The positive electrode plate according to claim 1, wherein in the safety coating (12), based on the total weight of the polymer matrix, the conductive material and the inorganic filler,
the content of the polymer matrix is from 50 wt % to 75 wt %,
the content of the conductive material is from 5 wt % to 20 wt %, and
the content of the inorganic filler is from 15 wt % to 45 wt %.

10. The positive electrode plate according to claim 1, wherein a weight ratio of the polymer matrix to the conductive material is 2 or more.

11. The positive electrode plate according to claim 10, wherein a weight ratio of the polymer matrix to the conductive material is 3 or more and 8 or less.

12. The positive electrode plate according to claim 1, wherein the current collector has an elongation at break $\delta$ satisfying $0.8\% \leq \delta \leq 4\%$ as measured by a method comprising taking two samples having a length of 200 mm and a width of 15 mm from the current collector, then mounting the sample on a tensile machine, starting the tensile machine and stretching at a speed of 50 mm/min until the sample breaks, wherein an initial length L0 is recorded, then reading a displacement L1 of the sample at the time of break from the tensile machine, then calculating the elongation at break= $(L1-L0)/L0*100\%$; and/or the current collector has a thickness of from 4 μm to 16 μm.

13. The positive electrode plate according to claim 1, wherein the positive electrode active material layer and the safety coating (12) together form a film layer having an elongation of 80% or more as measured by a method comprising removal of the current collector from the electrode plate to obtain a film layer of the positive electrode plate, preparing a sample having a width of 20 mm and a length of 50 mm from the resulting film layer, then mounting the sample on a tensile machine, wherein an initial length L0 is recorded, starting the tensile machine and stretching at 50 mm/min until the sample breaks, reading a displacement L1 of the sample at the time of break from the tensile machine, then calculating the elongation at break= $(L1-L0)/L0*100\%$.

14. The positive electrode plate according to claim 13, wherein the positive electrode active material layer and the safety coating (12) together form a film layer having an elongation of 80% or more and 300% or less; and/or the film layer has a single side thickness of from 30 μm to 80 μm.

15. An electrochemical device, comprising the positive electrode plate according to claim 1, wherein the electrochemical device is a capacitor, a primary battery or a secondary battery.

16. A battery module (4), comprising the electrochemical device according to claim 15.

17. A battery pack (1), comprising the battery module (4) according to claim 16.

18. A device, comprising the electrochemical device according to claim 15 as a power source.

19. The positive electrode plate according to claim 18, wherein the device comprises an electric vehicle, a hybrid electric vehicle, or a plug-in hybrid electric vehicle, an electric bicycle, an electric scooter, an electric golf cart, an electric truck, electric ships, or energy storage systems.

* * * * *